(12) United States Patent
Dumchin et al.

(10) Patent No.: US 12,432,055 B2
(45) Date of Patent: Sep. 30, 2025

(54) LOW LATENCY BLOCK CIPHER IN MEMORY DEVICES

(71) Applicant: Sandisk Technologies, Inc., Milpitas, CA (US)

(72) Inventors: Yan Dumchin, Beer Sheva (IL); Tzvi Alon, Jerusalem (IL); Yuval Yoskovits, Tel Aviv (IL)

(73) Assignee: Sandisk Technologies, Inc., Milpitas, CA (US)

( * ) Notice: Subject to any disclaimer, the term of this patent is extended or adjusted under 35 U.S.C. 154(b) by 588 days.

(21) Appl. No.: 17/732,943

(22) Filed: Apr. 29, 2022

(65) Prior Publication Data
US 2023/0353356 A1   Nov. 2, 2023

(51) Int. Cl.
*H04L 9/08* (2006.01)
*H04L 9/06* (2006.01)

(52) U.S. Cl.
CPC .......... *H04L 9/0891* (2013.01); *H04L 9/0618* (2013.01); *H04L 9/0861* (2013.01)

(58) Field of Classification Search
CPC .................... H04L 9/0618; H04L 9/0861
See application file for complete search history.

(56) References Cited

U.S. PATENT DOCUMENTS

| | | | | |
|---|---|---|---|---|
| 2008/0019504 A1* | 1/2008 | Han | ...................... | H04L 9/0631 380/28 |
| 2010/0246828 A1* | 9/2010 | Johnston | ............... | H04L 9/0631 380/278 |
| 2012/0224687 A1* | 9/2012 | Gueron | ................ | H04L 9/0631 380/28 |

OTHER PUBLICATIONS

Bogdanov, Andrey; Knudsen, Lars R.; Leander, Gregor; Paar, Christof; Poschmann, Axel; Robshaw, Matthew J. B.; Seurin, Yannick; Vikkelsoe, Charlotte (2007). "Present: An Ultra-Lightweight Block Cipher". Cryptographic Hardware and Embedded Systems—CHES 2007. Lecture Notes in Computer Science. vol. 4727. pp. 450-466. doi:10.1007/978-3-540-74735-2_31. ISBN 978-3-540-74734-5.

* cited by examiner

*Primary Examiner* — Nelson S. Giddins
(74) *Attorney, Agent, or Firm* — DENTONS Durham Jones Pinegar (57) ABSTRACT

A storage device includes multiple memory dies and a controller configured to: (i) encrypt a data block using a key schedule that includes a plurality of round keys generated from an encryption key, the encrypting resulting in an encrypted data block; (ii) during the encrypting, modify a key register during a first plurality of iterations, the key register being updated to a final state of the key register after a final iteration of the plurality of iterations; (iii) store the final state of the key register as a decryption key; and (iv) decrypt the encrypted data block using another key schedule that includes the plurality of round keys that are generated using the decryption key during a second plurality of iterations.

20 Claims, 6 Drawing Sheets

LOW LATENCY BLOCK CIPHER IN MEMORY DEVICES

BACKGROUND

Semiconductor memory and storage devices are widely used in various electronic devices such as cellular telephones, digital cameras, personal digital assistants, medical electronics, mobile computing devices, and non-mobile computing devices. Semiconductor memory may include non-volatile memory or volatile memory. A non-volatile memory allows information to be stored and retained even when the non-volatile memory is not connected to a power source (e.g., a battery). Examples of non-volatile memory include flash memory (e.g., NAND-type and NOR-type flash memory) and Electrically Erasable Programmable Read-Only Memory (EEPROM).

Some storage devices may use cryptographic hardware accelerators to improve the security of the device. Such accelerators typically implement encryption algorithms such as variations of Advanced Encryption Standard ("AES"). However, such encryption algorithms may provide a particular strength of security, but may also require significant additional requirements, such as additional storage area requirements, power consumption requirements, and processing time (e.g., "overheads" or "costs" of the algorithm).

The PRESENT algorithm, as described in "*PRESENT: An Ultra-Lightweight Block Cipher*" (Bogdanov et al.), was developed to provide a low power consumption cryptographic solution in a small area while still providing a reasonable level of security. For example, memories in external devices may be used to store data such as mapping between logical addresses and physical addresses in the flash memory. When data is stored in a host or some device external to the storage device (e.g., "control data" or the like), cryptographic ciphers may be used to protect such data (e.g., to prevent malicious attacks on the operations of the storage device).

However, such cryptographic implementations may introduce additional costs that cause performance impacts to the storage device. What is needed is an improved method for providing a block cipher that can improve on performance impacts of those known algorithms.

SUMMARY

The present application describes a method that includes encrypting a data block using a first key schedule that includes a plurality of round keys generated from an encryption key, the encrypting resulting in an encrypted data block. The method also includes modifying a key register during a first plurality of iterations during the encrypting. The key register is updated to a final state after a final iteration of the plurality of iterations. The method also includes storing the final state of the key register as a decryption key. The method further includes decrypting the encrypted data block using a second key schedule that includes the plurality of round keys that are generated using the decryption key during a second plurality of iterations.

The present application also describes a storage device that includes a non-volatile storage device having a plurality of memory dies and a plurality of memory cells. The storage device also includes a controller communicatively coupled to the non-volatile storage device and configured to: (i) encrypt a data block using a first key schedule that includes a plurality of round keys generated from an encryption key, the encrypting resulting in an encrypted data block; (ii) during the encrypting, modify a key register during a first plurality of iterations, the key register being updated to a final state after a final iteration of the plurality of iterations; (iii) store the final state of the key register as a decryption key; and (iv) decrypt the encrypted data block using a second key schedule that includes the plurality of round keys that are generated using the decryption key during a second plurality of iterations.

The present application also describes a storage device that includes a non-volatile storage device having a plurality of memory dies and a plurality of memory cells. The storage device also includes means for encrypting a data block using a first key schedule that includes a plurality of round keys generated from an encryption key, the encrypting resulting in an encrypted data block. The storage device further includes means for modifying a key register during a first plurality of iterations, the key register being updated to a final state after a final iteration of the plurality of iterations. The storage device also includes means for storing the final state of the key register as a decryption key. The storage device further includes means for decrypting the encrypted data block using a second key schedule that includes the plurality of round keys that are generated using the decryption key during a second plurality of iterations.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In a typical application of the PRESENT algorithm, a key schedule is generated during encryption and decryption prior to performing cryptographic operations on target data (e.g., a data block). In one embodiment, a private 80-bit encryption key is used to encrypt and decrypt 64-bit blocks. Generation of the key schedule typically creates a set of 32 "round keys" that are used in an iterative, sequential process to encrypt and decrypt the data block (e.g., where one round key is used during each iteration, and in a sequential order). However, in the original PRESENT algorithm, which may be referred to herein as the "known approach" for purposes of distinguishing the novel methods described herein, the key schedule is generated prior to the encryption or decryption operations. For example, generation of the 32 keys may be performed in 32 clock cycles (e.g., presuming one key generation per clock cycle) and then the encryption or decryption process is performed in another 32 clock cycles (e.g., presuming each iteration can be performed in one clock cycle). As such, the known approach takes ~64 clock cycles to complete an encryption or decryption of a data block. However, such a performance requirement, or "latency" in the cryptographic process, can be too burdensome for certain applications.

In order to provide certain performance improvements in such block ciphers, the present application describes a system for encrypting and decrypting data associated with storage devices. In an example embodiment, a cryptographic system for encrypting and decrypting control data used during the operation of the storage device is provided. This control data may be shared with devices external to the storage device (e.g., a host computing device) and, as such, may encrypt and decrypt such data during operation of the device.

In the example embodiment, the cryptographic system provides both an enhanced encryption process for encrypting the plain text of the block data as well as an enhanced decryption process for decrypting ciphertext into plain text of the block data. More specifically, the encryption and decryption processes parallelize the generation of the key schedule in conjunction with the encryption and decryption steps that are performed on the block data. A key register is used to track a key state as the keys are generated.

During encryption, the key register begins with the encryption key (e.g., an 80-bit key, a 128-bit key, or the like), and a data register begins with the plain text data of the data block (e.g., 64-bit data block). The next round key to be used during an iteration of the encryption process is the first 64 bits of the key register. Once the next round key is created, the process simultaneously or substantially simultaneously (A) performs encryption operations on the data register and (B) performs modification operations on the key register to generate the next round counter. Presuming the encryption operations take one cycle and the key modification operations take one cycle, the key modification operations to generate the next round key can be completed by the time the next iteration of the encryption operations are ready. As such, in this example, the encryption process can be completed in ~32 cycles rather than 64 cycles of the known approach (e.g., 1 cycle to generate the first round key, and 31 cycles of simultaneous encryption and round key generation iterations), thus providing a significant performance improvement during encryption.

In the known approach, during decryption, the algorithm uses the same encryption key to generate all 32 round keys prior to the iterative portion of the algorithm, and then uses the keys in reverse order to decrypt the encrypted data block. However, as mentioned in the example above, the known approach uses ~64 clock cycles to perform such a decryption (i.e., 32 cycles to first generate the round counters, then 32 cycles to perform the decryption operations in reverse order).

In the example embodiments described herein, at the end of the encryption process, the key register has been modified 32 times during the key generation operations, and the ending result of this modified key register is stored as a decryption key for this data block. During decryption, the system uses this decryption key as a starting key for the decryption process. The decryption key is loaded into the key register and the system performs 31 iterations in reverse order to decrypt the encrypted data block. More specifically, during each iteration (e.g., from 31 down to 1), the system simultaneously or substantially simultaneously (A) generates the next round key from the key register and (B) uses the prior-generated round key to perform decryption operations on the data block, each using inverse operations. As such, the example decryption process does not need to generate all of the round keys prior to beginning decryption. Instead, the round keys can be generated during the decryption process and similarly parallelized such that the example decryption can be completed in ~32 clock cycles.

These various benefits and examples will be described in greater detail below with reference to FIGS. 1-5.

Figure 1A:
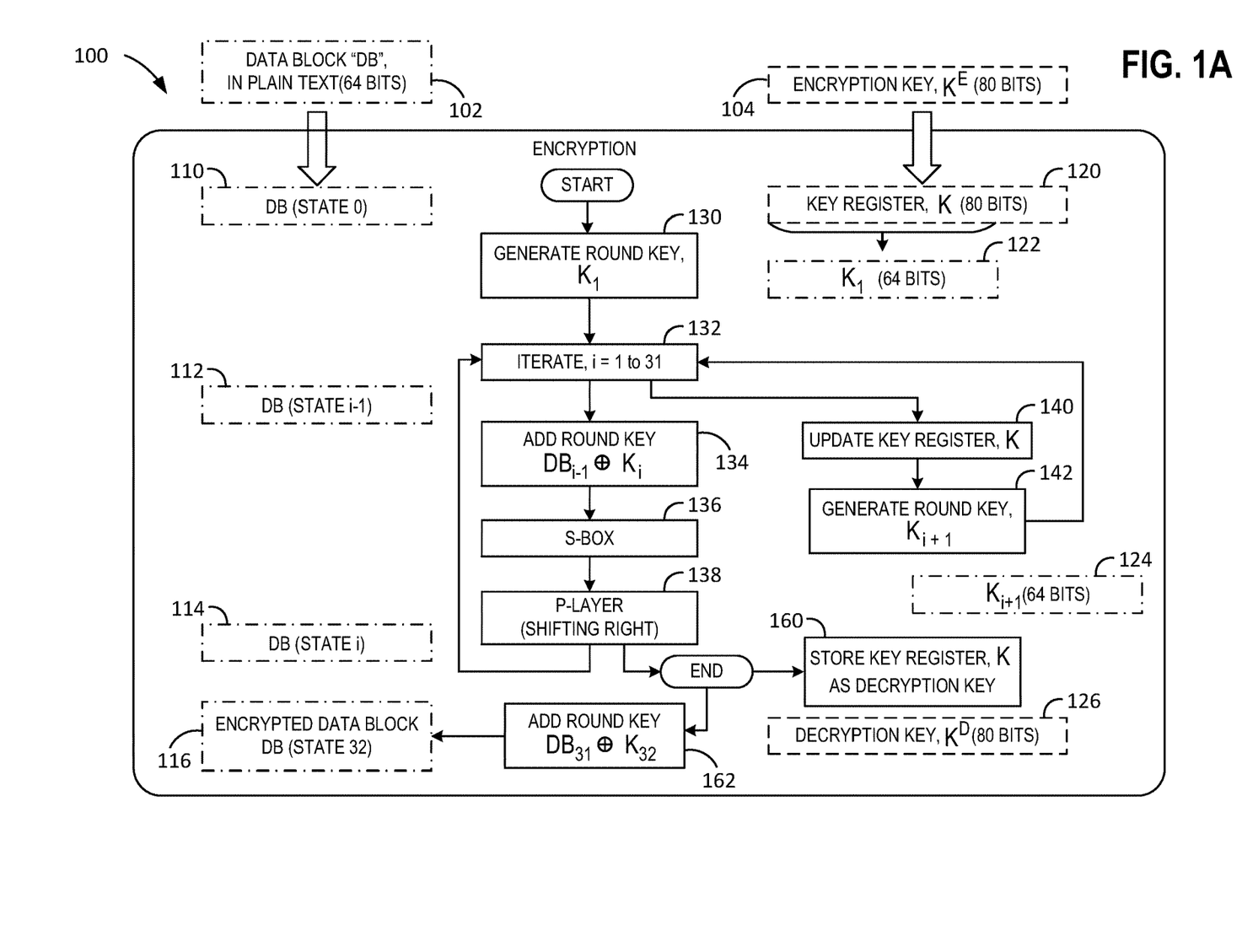
FIGS. 1A and 1B illustrate an example method for encrypting data used by a storage device.
Figure 1B:
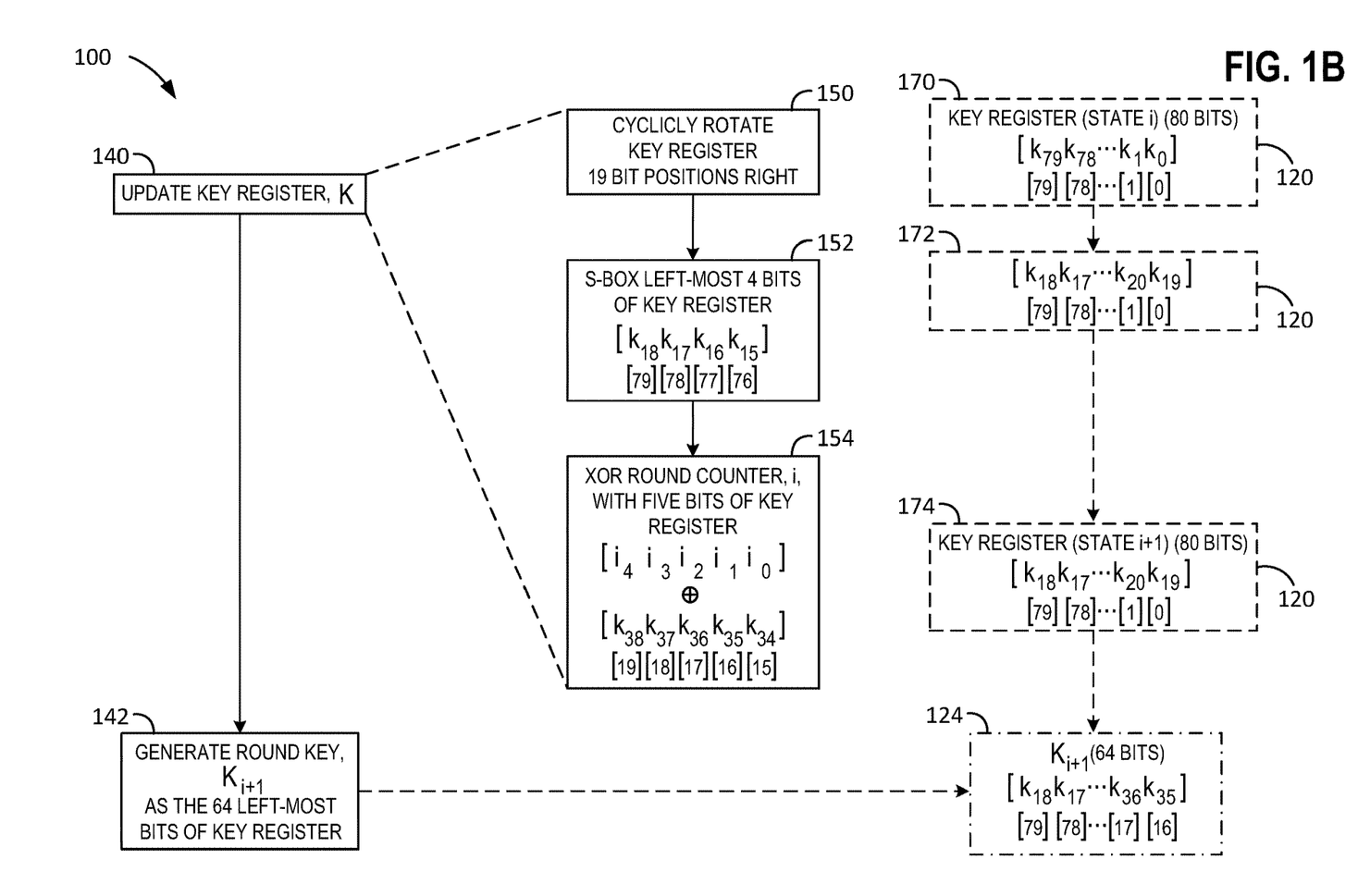

FIGS. 1A and 1B illustrate an example encryption method 100 for encrypting data used by a storage device. In the example embodiment, the method 100 encrypts a data block "DB" 102 of plain text (e.g., data in its unencrypted form) using an encryption key 104, $K^E$. While the examples described herein use a size of 64 bits for the data block 102 and 80 bits for the encryption key 104, it should be understood that other sizes for the data block 102, the encryption key 104, or both, are possible.

In the example embodiment, the method 100 begins with a DB 110 of 64 bits in size and having been assigned a starting value of the unencrypted data block 102 (shown here as "state 0" or the beginning state of the data to be encrypted). During operation, the DB 110 is modified by the method 100 through the course of an iterative process to yield an encrypted data block 116 at the end of the method 100. The current state of the DB 110 is illustrated in FIG. 1A and discussed herein by its current state at various stages of the iterative process, and based the current iteration number, i. As such, the various states of the DB 110 may be referred to herein as $DB_n$, where n is the state or stage of the iterative process. For example, the DB 110 at "STATE 0" may be referred to as $DB_0$.

In addition, the method 100 also uses a key register 120, K, of 80 bits in size and having been assigned a starting value of the original encryption key 104, $K^E$. During operation, the key register 120, K, is modified by the method 100 through the course of the iterative process. Similarly, the current state of the key register 120 is illustrated in FIGS. 1A and 1B and discussed herein by its current state at various stages of the iterative process, and based the current iteration number, i. In addition, during operation, the iterative process of method 100 also generates a set of 32 round keys, $K_1$-$K_{32}$, each of which is 64 bits in size. Each of these round keys, $K_n$, are generated based on the content of a current state of the key register 120, K, at various stages of the iterative process. While the number of iterations, i, is 31 and the number of round keys is 32 (e.g., n+1), it should be understood that more or fewer iterations, i, and associated round keys, $K_n$, are possible. These round keys, $K_n$, may be referred to herein as the key schedule for a given encryption/decryption process.

In the example embodiment, the method 100 begins by generating a first round key 122, $K_1$, at operation 130. The round key 122, $K_1$, is set to the first 64 bits (e.g., most significant 64 bits) of the key register 120, K. At operation 132, the method 100 begins the iterative process, starting with the iteration number, i, set to 1 and increasing one every iteration through 31 (e.g., 31 iterations). The iterative process provides two threads of execution that are performed in parallel with each other, namely a data encryption thread and a key processing thread. The data encryption thread includes a set of operations 134, 136, and 138 that operate upon the data to be encrypted (illustrated in FIG. 1A, in various states, as DB 110-116). The key processing thread includes a set of operations 140, 142 that are performed (e.g., simultaneously or substantially simultaneously) on the key register 120, K, as illustrated and described in FIGS. 1A and 1B.

In the data encryption thread, and referring now to FIG. 1A, each iteration, i, begins with the DB 112 in a beginning state for that iteration (here shown as "STATE i−1"). As such, during the first iteration, the DB 112 is in "STATE 0", as shown in DB 110, which is the as yet unmodified plain text of data block 102. At operation 134, the DB 112 is modified by XOR-ing the DB 112 with the round key, $K_i$, of the current round. During the first iteration, i=1, the round key 122, $K_1$, is XOR'd with the DB 112 (e.g., $DB_{i-1}$). While not separately illustrated here, it should be understood that the result of the XOR is stored into the DB 112, thus modifying the DB 112.

At operation 136, in the example embodiment, the method 100 includes performing an "S-box" operation on the DB 112. The S-box operation 136 is a 4-bit to 4-bit S-box of the known approach, S: $\mathbb{F}_2^4 \to \mathbb{F}_2^4$, where the action of this box in hexadecimal notation is given by the following table:

TABLE 1

| | 4-bit to 4-bit S-Box | | | | | | | | | | | | | | | |
|---|---|---|---|---|---|---|---|---|---|---|---|---|---|---|---|---|
| x | 0 | 1 | 2 | 3 | 4 | 5 | 6 | 7 | 8 | 9 | A | B | C | D | E | F |
| S[x] | C | 5 | 6 | B | 9 | 0 | A | D | 3 | E | F | 8 | 4 | 7 | 1 | 2 | where the current state of DB 112 (e.g., $b_{63} \ldots b_0$) is treated as 16 4-bit words (e.g., $w_0 \ldots w_{15}$), and where $w_i = b_{4*i+3} \| b_{4*i+2} \| b_{4*i+1} \| b_{4*i}$ for $0 \le i \le 15$, and where the output nibble $S[w_i]$ provides the updated state values. In the example embodiment, each word, $w_i$, is operated upon separately and in parallel.

At operation 138, in the example embodiment, the method 100 includes performing permutation operation (e.g., "P-layer") on the DB 112. The P-layer operation 138 shuffles the bits of the DB 112 as in the known approach, where bit i of the DB 112 is moved to bit position P(i), as shown in the following table:

TABLE 2

| | P-Layer Bit Permutation | | | | | | | | | | | | | | | |
|---|---|---|---|---|---|---|---|---|---|---|---|---|---|---|---|---|
| i | 0 | 1 | 2 | 3 | 4 | 5 | 6 | 7 | 8 | 9 | 10 | 11 | 12 | 13 | 14 | 15 |
| P(i) | 0 | 16 | 32 | 48 | 1 | 17 | 33 | 49 | 2 | 18 | 34 | 50 | 3 | 19 | 35 | 51 |
| i | 16 | 17 | 18 | 19 | 20 | 21 | 22 | 23 | 24 | 25 | 26 | 27 | 28 | 29 | 30 | 31 |
| P(i) | 4 | 20 | 36 | 52 | 5 | 21 | 37 | 53 | 6 | 22 | 38 | 54 | 7 | 23 | 39 | 55 |
| i | 32 | 33 | 34 | 35 | 36 | 37 | 38 | 39 | 40 | 41 | 42 | 43 | 44 | 45 | 46 | 47 |
| P(i) | 8 | 24 | 40 | 56 | 9 | 25 | 41 | 57 | 10 | 26 | 42 | 58 | 11 | 27 | 43 | 59 |
| i | 48 | 49 | 50 | 51 | 52 | 53 | 54 | 55 | 56 | 57 | 58 | 59 | 60 | 61 | 62 | 63 |
| P(i) | 12 | 28 | 44 | 60 | 13 | 29 | 45 | 61 | 14 | 30 | 46 | 62 | 15 | 31 | 47 | 63 | or where:

$$P(j) = \begin{cases} j*16 \bmod 63 & 0 \le j \le 62 \\ 63 & j = 63 \end{cases}$$

After operation 138, DB 112 (e.g., $DB_{i-1}$ from the prior STATE i−1) is transformed into DB 114 (e.g., $DB_{i-1}$ of STATE i). As such, the data encryption thread of operations 134-138 are complete for this iteration and the process is ready to return to operation 132 to begin the next iteration.

Simultaneously or substantially simultaneously to the execution of the data encryption thread of operations 134-138, the method 100 also includes performing the key processing thread of operations 140 and 142. At operation 140, the key processing thread includes updating the key register 120, K. At operation 142, the key processing thread includes generating the next round key 124, $K_{i+1}$ (e.g., the round key needed for the next iteration, i+1). FIG. 1B illustrates additional details on the key processing thread of operations.

Referring now to FIG. 1B, operation 140 includes several operations 150, 152, 154 that operate on the key register 120, K. For purposes of illustration, the key register 120, K, is shown here in a starting state, namely key register 170 of STATE i (e.g., the 80 bits, $k_{79}k_{78} \ldots k_1k_0$, of the key register 120, K, where $k_{79}$ is the most significant bit), and an updated state after operations 150-154 are performed, namely key register 175 of STATE i+1. It should be understood that some subscripts are used here to indicate a position of a particular bit at a particular state, while bracketed numbers (e.g., "[79]", "[78]", . . . , "[1]", "[0]") are used to indicate an absolute position of the key register 120, K. Further, like the encryption operations 134-138 shown in FIG. 1A, the key processing operations 150-154 operate upon the key register 120, K (e.g., where the results of the operation are applied to the associated bits of the key register 120, K).

In the example embodiment, the key register 120, K, begins with the current state of the key register 170 at STATE i. At operation 150, the bits of the key register 170 are cyclically rotated 19 bit positions to the right (e.g., or, equivalently, 61 bit positions to the left). An interim key register 172 is shown here, where $k_{18}$ becomes the most significant bit (e.g., in bit position [79] of the key register 120) and $k_{19}$ becomes the least significant bit (e.g., in bit position [0] of the key register 120) after the cyclic rotation. At operation 152, the left-most four bits of the key register 172 (e.g., $k_{18}k_{17}k_{16}k_{15}$ of the most significant bit positions [79], [78], [77], [76]) are S-Box'd using the known PRESENT S-Box. At operation 154, the current round counter, i (e.g., represented in five bits $i_4 \ldots i_0$), is XOR'd with the five bit positions [19]-[15] of the key register 120 (e.g., which currently storing the values $k_{38}$-$k_{34}$ of the original key register 170 from STATE i).

Upon completion of operation 154, the key register 120 has been updated to the key register 174 of STATE i+1. Operation 142 then uses the current key register 174 at STATE 1+1 to generate the next round counter 124, $K_{i+1}$, as the first 64 bits of the key register 174 (e.g., the current values $k_{18} \ldots k_{35}$ of bit positions [79] . . . [16]). Accordingly, the next round counter 124, $K_i$1, is prepared for the next iteration.

Returning again to FIG. 1A, once the encryption thread of operations 134-138 and the key processing thread of operations 140-142 are complete, the method 100 continues with the next iteration at operation 132. Similarly, the encryption thread of operations 134-138 continue modifying the state of the DB 112 using the next round key generated by the prior iteration of the key processing thread, and the key processing thread continues modifying the key register 120 and generating the next round key 124. After the $31^{st}$ iteration is complete, the method 100 includes XOR'ing the final round key, $K_{32}$, to $DB_{31}$ (e.g., the DB 114 after iteration 31) at operation 162. As such, the DB 112 has been modified through the method 100 such that the modified DB 114 after operation 162 becomes the encrypted data block 116 (e.g., the DB at STATE 32).

In the example embodiment, the encryption thread and the key processing thread are each processed during a single clock cycle, and in parallel during the same clock cycle. As such, each iteration of the method 100 takes one clock cycle, for a total of 1 clock cycle to generate the first round key 130, 31 clock cycles for the iteration processing, and one clock cycle for a final XOR of the last DB 114 using the $32^{nd}$ round key, $K_{32}$, for a total of 33 clock cycles. This yields a significant processing improvement (e.g., reduced latency) during encryption of the data block 102 over the known approach. For example, and as a summary, the method 100 may be viewed, by clock cycle, as:

TABLE 3

Encryption Summary, by Clock Cycle

| | Encryption | Key Processing |
|---|---|---|
| (cycle 1) | | Generate $K_1$ |
| (cycle 2) | Apply $K_1$ to DB | Generate $K_2$ |
| (cycle 3) | Apply $K_2$ to DB | Generate $K_3$ |
| . . . | | |
| (cycle 32) | Apply $K_{31}$ to DB | Generate $K_{32}$ |
| (cycle 33) | Apply $K_{32}$ to DB | |

Figure 2A:
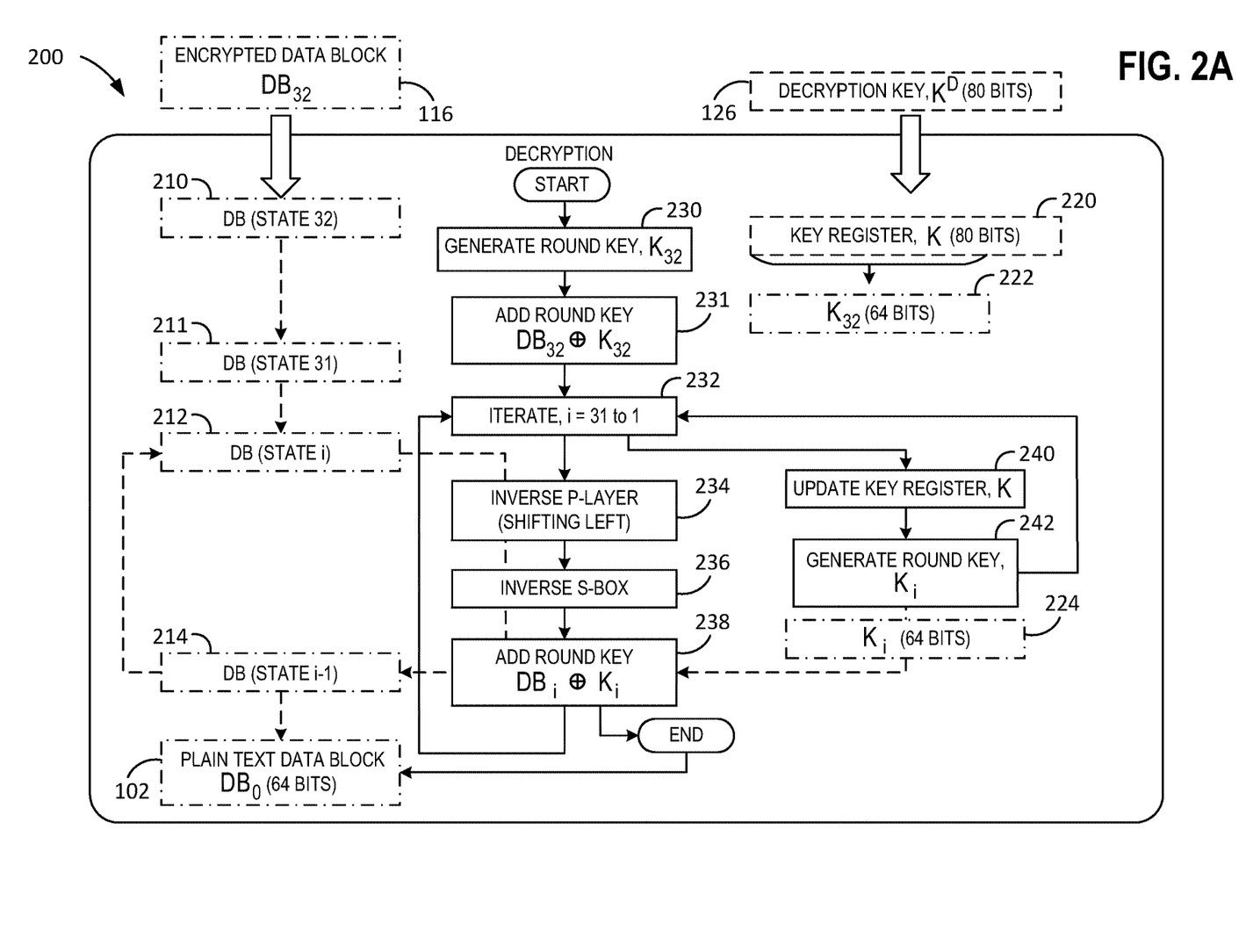
FIGS. 2A and 2B illustrate an example method for decrypting data that was encrypted using the method shown in FIGS. 1A and 1B.
Figure 2B:
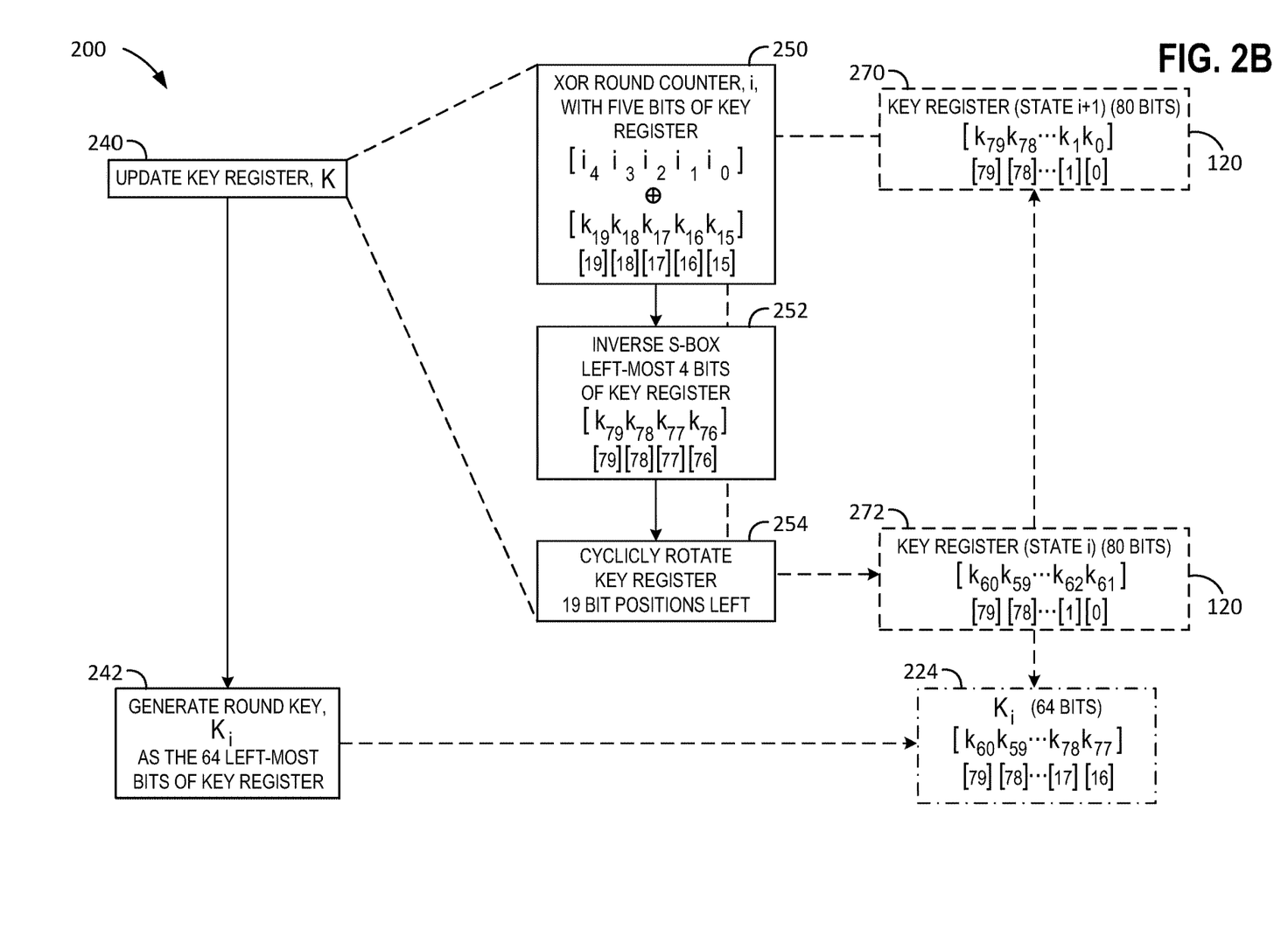

FIGS. 2A and 2B illustrate an example method 200 for decrypting data that was encrypted using the method 100 shown in FIGS. 1A and 1B. In the example embodiment, the method 200 decrypts the encrypted data block "DB" 116 (e.g., data in its unencrypted form) that was encrypted in FIGS. 1A-1B. Further, the decryption method 200 uses the decryption key 126, $K^D$, that was stored at operation 160 of FIG. 1A. It should be understood that aspects of method 200 may be similar to method 100 shown in FIGS. 1A-1B and thus may be similarly described.

In the example embodiment, the method 200 begins with the encrypted data block 210, of 64 bits in size and having been assigned a starting value of the encrypted data block 116, $DB_{32}$ (shown here as "state 32" or the ending state of the data from method 100). Similar to the encryption method 100, during operation, the DB 210 is modified by the method 200 through the course of an iterative process to yield the unencrypted data block 102 at the end of the method 200. The current state of the DB 210 is illustrated in FIG. 2A and discussed herein by its current state at various stages of the iterative process, and based on the current iteration number, i. As such, the various states of the DB 210 may similarly be referred to herein as $DB_n$, where n is the state or stage of the iterative process. For example, the DB 210 at "STATE 31" may be referred to as $DB_{31}$.

In addition, the method 200 also similarly uses a key register 220, K, of 80 bits in size and having been assigned a starting value of the decryption key 126, $K^D$. During operation, the key register 220, K, is modified by the method 200 through the course of the iterative process. Similarly, the current state of the key register 220 is illustrated in FIGS. 2A and 2B and discussed herein by its current state at various stages of the iterative process, and based the current iteration number, i. In addition, during operation, the iterative process of method 200 also generates a set of 32 round keys, $K_{32}$-$K_1$, each of which is 64 bits in size. Each of these round keys, $K_n$, are generated based on the content of a current state of the key register 220, K, at various stages of the iterative process. While the number of iterations, i, is 31 and the number of round keys is 32 (e.g., n+1), it should be understood that more or fewer iterations, i, and associated round keys, $K_n$, are possible.

In the example embodiment, the method 200 begins by generating the last round key 222, $K_{32}$, of the key schedule at operation 230. The round key 222, $K_{32}$, is set to the first 64 bits (e.g., most significant 64 bits) of the key register 220, K. At operation 231, that round key 222, $K_{32}$, is XOR'd with $DB_{32}$ 210 to generate $DB_{31}$ 211. At operation 232, the method 200 begins the iterative decryption process, starting with the iteration number, i, set to 31 and decreasing one every iteration through 1 (e.g., 31 iterations). The iterative process provides two threads of execution that are performed in parallel with each other, namely a data decryption thread and a key processing thread. The data encryption thread includes a set of operations 234, 236, and 238 that operate upon the data to be decrypted (illustrated in FIG. 2A, in various states, as DB 212-214). The key processing thread includes a set of operations 240, 242 that are performed (e.g., simultaneously) on the key register 220, K, as illustrated and described in FIGS. 2A and 2B.

In the key processing thread, the method 200 includes performing the key processing thread of operations 240 and 242. At operation 240, the key processing thread includes updating the key register 220, K. At operation 242, the key processing thread includes generating the round key 124, $K_i$, that will be used in the decryption thread this iteration. FIG. 1B illustrates additional details on the key processing thread of operations.

Referring now to FIG. 2B, operation 240 includes several operations 250, 252, 254 that operate on the key register 220, K. For purposes of illustration, the key register 220, K, is shown here in a starting state, namely key register 270 of STATE i+1 (e.g., the 80 bits, $k_{79}k_{78} \ldots k_1k_0$, of the key register 120, K, where $k_{79}$ is the most significant bit), and these operations act upon the key register 120. At operation 250, the current round counter, i (e.g., represented in five bits $i_4 \ldots i_0$), is XOR'd with the five bit positions [19]-[15] of the key register 120 (e.g., which currently storing the values $k_{19}$-$k_{15}$ of the original key register 270 from STATE i+1). At operation 252, the left-most four bits of the key register 172 (e.g., $k_{79}k_{78}k_{77}k_{76}$ of the most significant bit positions [79], [78], [77], [76]) are inverse S-Box'd using the known PRESENT S-Box.

At operation 254, the bits of the key register 170 are cyclically rotated 19 bit positions to the left (e.g., or, equivalently, 61 bit positions to the right). The updated key register 120 is shown here as key register 172 of STATE i, where $k_{60}$ becomes the most significant bit (e.g., in bit position [79] of the key register 120) and $k_{61}$ becomes the least significant bit (e.g., in bit position [0] of the key register 120) after the cyclic rotation.

Upon completion of operation 154, the key register 120 has been updated to the key register 272 of STATE i. Operation 242 then uses the current key register 272 at STATE i to generate the round counter 224, $K_i$, from as the first 64 bits of the key register 272 (e.g., the current values $k_{60} \ldots k_{61}$ of bit positions [79] ... [16]). Accordingly, the round counter 224, $K_i$, for this round is prepared for the decryption operation.

Returning again to FIG. 2A, in the data decryption thread, each iteration, i, begins with the DB 212 in a beginning state for that iteration (here shown as "STATE i"). As such, during the first iteration, the DB 212 is in "STATE 31", as shown in DB 110, which is the as yet unmodified encrypted text of data block 116. At operation 234, in the example embodiment, the method 100 includes performing an inverse permutation operation (e.g., "inverse P-layer", or $P^{-1}$) on the DB 212. The inverse P-layer operation 234 shuffles the bits of the DB 212 as in the known approach, where bit i of the DB 212 is moved to bit position $P^{-1}(i)$, as shown in the following table:

TABLE 4

Inverse P-Layer Bit Permutation

| i    | 0  | 1  | 2  | 3  | 4  | 5  | 6  | 7  | 8  | 9  | 10 | 11 | 12 | 13 | 14 | 15 |
|------|----|----|----|----|----|----|----|----|----|----|----|----|----|----|----|----|
| P(i) | 0  | 4  | 8  | 12 | 16 | 20 | 24 | 28 | 32 | 36 | 40 | 44 | 48 | 52 | 56 | 60 |
| i    | 16 | 17 | 18 | 19 | 20 | 21 | 22 | 23 | 24 | 25 | 26 | 27 | 28 | 29 | 30 | 31 |
| P(i) | 1  | 5  | 9  | 13 | 17 | 21 | 25 | 29 | 33 | 37 | 41 | 45 | 49 | 53 | 57 | 61 |
| i    | 32 | 33 | 34 | 35 | 36 | 37 | 38 | 39 | 40 | 41 | 42 | 43 | 44 | 45 | 46 | 47 |
| P(i) | 2  | 6  | 10 | 14 | 18 | 22 | 26 | 30 | 34 | 38 | 42 | 46 | 50 | 54 | 58 | 62 |
| i    | 48 | 49 | 50 | 51 | 52 | 53 | 54 | 55 | 56 | 57 | 58 | 59 | 60 | 61 | 62 | 63 |
| P(i) | 3  | 7  | 11 | 15 | 19 | 23 | 27 | 31 | 35 | 39 | 43 | 47 | 51 | 55 | 59 | 63 | or where:

$$P^{-1}(j) = \begin{cases} j*4 \bmod 63 & 0 \le j \le 62 \\ 63 & j = 63 \end{cases}$$

At operation 236, in the example embodiment, the method 100 includes performing an "inverse S-box" operation on the DB 212. The inverse S-box operation 236 is a 4-bit to 4-bit inverse S-box of the known approach. For example:

TABLE 5

4-bit to 4-bit inverse S-Box

| x    | 0 | 1 | 2 | 3 | 4 | 5 | 6 | 7 | 8 | 9 | A | B | C | D | E | F |
|------|---|---|---|---|---|---|---|---|---|---|---|---|---|---|---|---|
| S[x] | 5 | E | F | 8 | C | 1 | 2 | D | B | 4 | 6 | 3 | 0 | 7 | 9 | A |

At operation 238, the DB 212 is modified by XOR-ing the DB 212 with the round key, $K_i$, of the current round (e.g., as computed during the key processing operations 240-242). During the first iteration, i=31, the round key 224, $K_{31}$, is XOR'd with the DB 212 of STATE 31 (e.g., $DB_{31}$) after the operations 234-236. After operation 238, DB 212 is transformed by into DB 214 (e.g., $DB_{i-1}$ of STATE i−1). As such, the data encryption thread of operations 234-238 are complete for this iteration and the process is ready to return to operation 232 to begin the next iteration.

Once the encryption thread of operations 234-238 and the key processing thread of operations 240-242 are complete, the method 200 continues with the next iteration at operation 232. Similarly, the encryption thread of operations 234-238 continue modifying the state of the DB 212 using the next round key generated during each iteration of the key processing thread, and the key processing thread continues modifying the key register 120 and generating the current round key 224. After the $31^{st}$ iteration is complete (e.g., after the iteration of i=1), the DB 112 has been modified such that the last DB 214 after the $31^{st}$ iteration becomes the encrypted data block 116 (e.g., the $DB_0$ at STATE 0).

In the example embodiment, the decryption thread and the key processing thread are each processed during a single clock cycle, and in parallel during the same clock cycle. As such, each iteration of the method 200 takes one clock cycle, for a total of 1 clock cycle to generate the $32^{nd}$ round key and 31 clock cycles for the iteration processing, for a total of 32 clock cycles. This yields a significant processing improvement (e.g., reduced latency) during decryption of the encrypted data block 116 over the known approach. For example, and as a summary, the method 200 may be viewed, by clock cycle, as:

TABLE 6

Decryption Summary, by Clock Cycle

|           | Encryption          | Key Processing  |
|-----------|---------------------|-----------------|
| (cycle 1) |                     | Generate $K_{32}$ |
| (cycle 2) | Apply $K_{32}$ to DB | Generate $K_{31}$ |
| (cycle 3) | Apply $K_{31}$ to DB | Generate $K_{30}$ |

TABLE 6-continued

Decryption Summary, by Clock Cycle

|  | Encryption | Key Processing |
|---|---|---|
| (cycle 4) | Apply $K_{30}$ to DB |  |
| ... |  |  |
| (cycle 32) | Apply $K_2$ to DB | Generate $K_1$ |
| (cycle 33) | Apply $K_1$ to DB |  |

It should be noted that the known approach generates all 32 of the round counters $K_1$-$K_{32}$ prior to encrypting a data block, and similarly generates all of the round counters $K_1$-$K_{32}$ prior to decrypting the same data block. Presuming one clock cycle for each round key generation and one cycle for each iteration to apply the round key, this known approach requires 32 clock cycles to generate the round keys, then 32 clock cycles to apply the round keys, both when encrypting the data block (e.g., in forward order), and when decrypting that encrypted data block (e.g., in reverse order). Thus, the known approach uses 64 clock cycles to perform either encryption or decryption of a block. Further, when considering decryption in the known approach, the $31^{st}$ round key is the first round key applied to the encrypted data during decryption, and working backward to the $1^{st}$ round key. As such, the known approach cannot start decryption operations on the encrypted block until that $31^{st}$ round key is generated.

In the example embodiments described herein, these and other limitations of the known approach are overcome by the encryption methods 100 and decryption methods 200 described herein. More specifically, after the encryption process 100 is complete for the DB 102 shown in FIG. 1A, the resultant key register 120, as modified by the key processing thread of operations 140, 142 through the iterations, is stored as a decryption key 126, $K^D$, at operation 160. In other words, the key register 120 after iteration 31 becomes the decryption key 126, $K^D$. This decryption key 126, $K^D$, allows the decryption process to both begin the decryption process without having to generate all 32 round keys of the key schedule, as well as parallelize the generation of the round keys with each iteration of the decryption process.

Figures 3, 4:
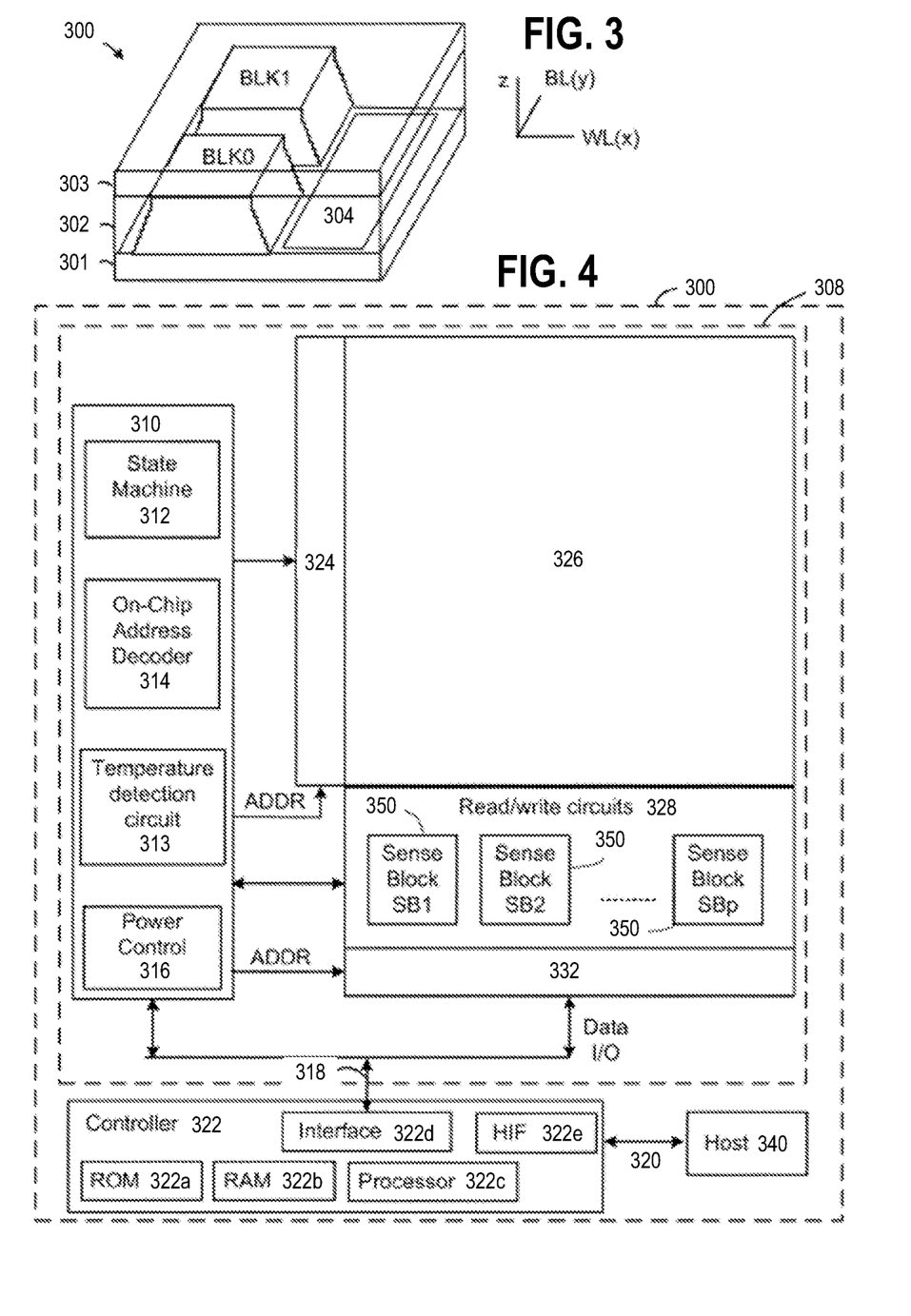
FIG. 3 is a perspective view of a storage system that includes three-dimensional (3D) stacked non-volatile memory.
FIG. 4 is a functional block diagram of an example storage device, such as the 3D stacked non-volatile storage device of FIG. 3
Figure 5:
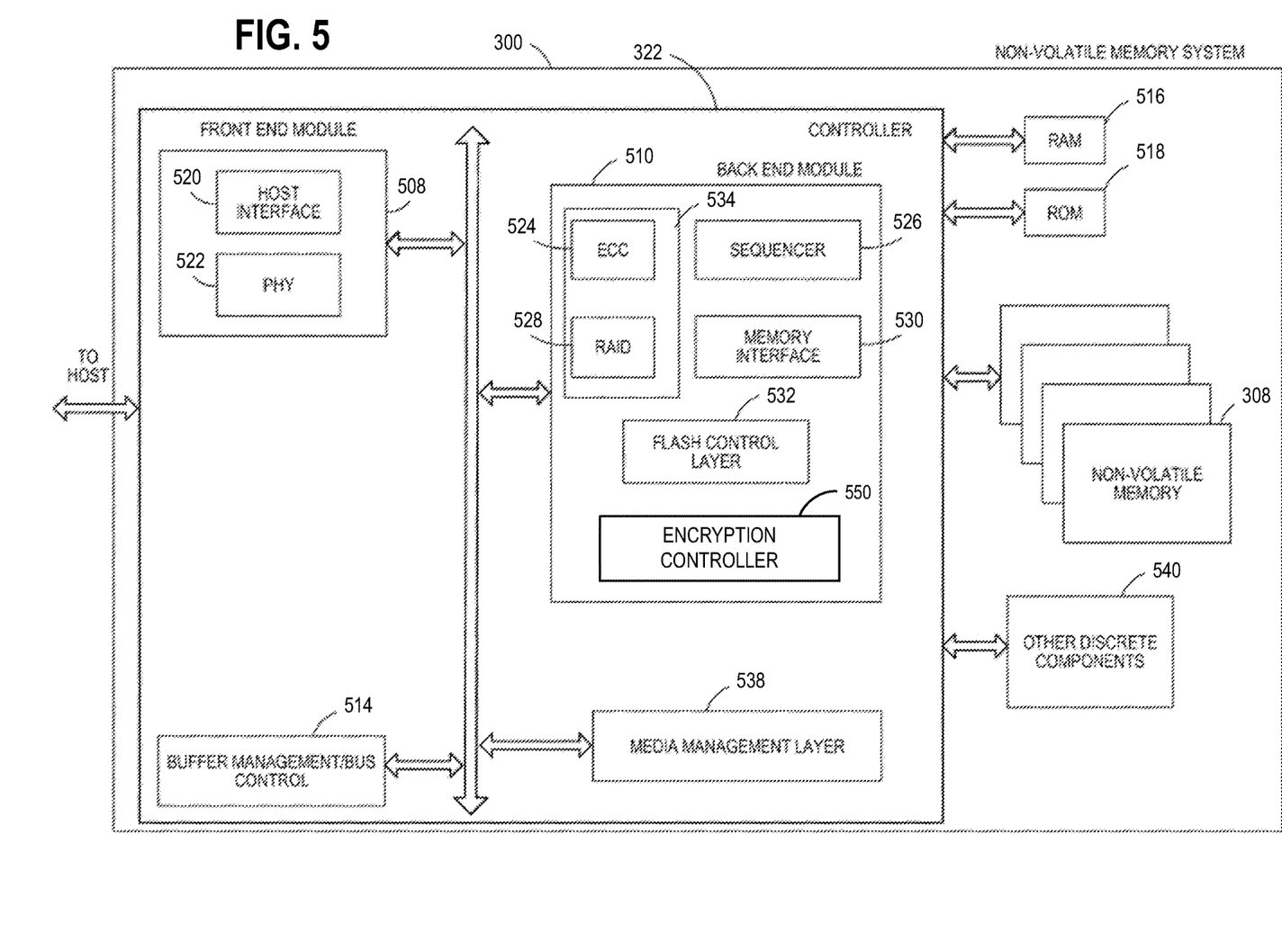
FIG. 5 is an example block diagram of example storage system, depicting more details of the controller.

FIGS. 3-5 describe one example of a storage system that can be used to implement the methods 100, 200 described above. FIG. 3 is a perspective view of a storage device 300 that includes three-dimensional (3D) stacked non-volatile memory. The storage device 300 includes a substrate 301. On and above the substrate are example blocks of memory cells, including BLK0 and BLK1, formed of memory cells (non-volatile memory elements). Also on substrate 301 is peripheral area 304 with support circuits for use by the blocks. Substrate 301 can also carry circuits under the blocks, along with one or more lower metal layers which are patterned in conductive paths to carry signals of the circuits. The blocks are formed in an intermediate region 302 of the storage device 300. In an upper region 303 of the storage device 300, one or more upper metal layers are patterned in conductive paths to carry signals of the circuits. Each block of memory cells includes a stacked area of memory cells, where alternating levels of the stack represent word lines. While two blocks are depicted as an example, additional blocks can be used, extending in the x- and/or y-directions.

In one example implementation, the length of the plane in the x-direction represents a direction in which signal paths for word lines extend (e.g., a word line or drain-end select gate (SGD) line direction) and the width of the plane in the y-direction represents a direction in which signal paths for bit lines extend (e.g., a bit line direction). The z-direction represents a height of the storage device 300.

FIG. 4 is a functional block diagram of an example storage device, such as the 3D stacked non-volatile storage device 300 of FIG. 3. The components depicted in FIG. 4 are electrical circuits. Storage device 300 includes one or more memory dies 308. Each memory die 308 includes a three-dimensional memory structure 326 of memory cells (e.g., a 3D array of memory cells), control circuitry 310, and read/write circuits 328. In other embodiments, a two-dimensional array of memory cells can be used. Memory structure 326 is addressable by word lines via a decoder 324 (e.g., row decoder) and by bit lines via a column decoder 332. The read/write circuits 328 include multiple sense blocks 350 including SB1, SB2, . . . , SBp (e.g., sensing circuitry) and allow a page of memory cells to be read or programmed in parallel. In some systems, a controller 322 is included in the same storage device 300 (e.g., a removable storage card) as the one or more memory dies 308. In some embodiments, the controller is formed on a die that is bonded to a memory die, in which case each memory die has its own controller. In other embodiments, a controller die controls all of the memory dies. Commands and data are transferred between the host 340 and controller 322 via a data bus 320, and between controller 322 and one or more of the memory dies 308 via lines 318. In one embodiment, memory die 308 includes a set of input and/or output (I/O) pins that connect to lines 318.

Memory structure 326 may include one or more arrays of memory cells, including a 3D array. The memory structure may include a monolithic 3D memory structure in which multiple memory levels are formed above (e.g., and not in) a single substrate, such as a wafer, with no intervening substrates. The memory structure may include any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

Control circuitry 310 cooperates with the read/write circuits 328 to perform memory operations (e.g., erase, program, read, and others) on memory structure 326, and includes a state machine 312, an on-chip address decoder 314, and a power control module 316. The state machine 312 provides chip-level control of memory operations. Temperature detection circuit 313 is configured to detect temperature, and can be any suitable temperature detection circuit known in the art. In one embodiment, state machine 312 is programmable by the software. In other embodiments, state machine 312 does not use software and is completely implemented in hardware (e.g., electrical circuits). In one embodiment, control circuitry 310 includes registers, ROM fuses, and other devices for storing default values such as base voltages and other parameters.

The on-chip address decoder 314 provides an address interface between addresses used by host 340 or controller 322 to the hardware address used by the decoders 324 and 332. Power control module 316 controls the power and voltages supplied to the word lines and bit lines during memory operations. It can include drivers for word line layers in a 3D configuration, select transistors (e.g., SGS and SGD transistors) and source lines. Power control module 316 may include charge pumps for creating voltages. The sense blocks include bit line drivers. An SGS transistor is a select gate transistor at a source end of a NAND string, and an SGD transistor is a select gate transistor at a drain end of a NAND string.

Any one or any combination of control circuitry 310, state machine 312, decoders 314/324/332, temperature detection circuit 313, power control module 316, sense blocks 350, read/write circuits 328, and controller 322 can be considered one or more control circuits, or a managing circuit, that performs some or all of the functions described herein.

Controller 322, which in one embodiment is an electrical circuit that may be on-chip or off-chip, may include one or more processors 322c, ROM 322a, RAM 322b, memory interface 322d, and host interface 322e, all of which are interconnected. One or more processors 322c is one example of a control circuit. Other embodiments can use state machines or other custom circuits designed to perform one or more functions. Devices such as ROM 322a and RAM 322b may include code such as a set of instructions, and the processor 322c may be operable to execute the set of instructions to provide some or all of the functionality described herein. Alternatively or additionally, processor 322c may access code from a memory device in the memory structure, such as a reserved area of memory cells connected to one or more word lines. Memory interface 322d, in communication with ROM 322a, RAM 322b, and processor 322c, is an electrical circuit that provides an electrical interface between controller 322 and memory die 308. For example, memory interface 322d can change the format or timing of signals, provide a buffer, isolate from surges, latch I/O, and so forth. Processor 322c may issues commands to control circuitry 310, or any other component of memory die 308, via memory interface 322d. Host interface 322e, in communication with ROM 322a, RAM 322b, and processor 322c, is an electrical circuit that provides an electrical interface between controller 322 and host 340. For example, host interface 322e can change the format or timing of signals, provide a buffer, isolate from surges, latch I/O, and so forth. Commands and data from host 340 are received by controller 322 via host interface 322e. Data sent to host 340 are transmitted via host interface 322e.

Multiple memory elements in memory structure 326 may be configured so that they are connected in series or so that each element is individually accessible. By way of non-limiting example, flash memory devices in a NAND configuration (e.g., NAND flash memory) typically contain memory elements connected in series. A NAND string is an example of a set of series-connected memory cells and select gate transistors.

A NAND flash memory array may be configured so that the array includes multiple NAND strings, where a NAND string includes multiple memory cells sharing a single bit line and that are accessed as a group. Alternatively, memory elements may be configured so that each element is individually accessible (e.g., a NOR memory array). NAND and NOR memory configurations are exemplary, and memory cells may be otherwise configured.

The memory cells may be arranged in the single memory device level in an ordered array, such as in a plurality of rows and/or columns. However, the memory elements may be arrayed in non-regular or non-orthogonal configurations, or in structures not considered arrays.

Some three-dimensional memory arrays are arranged so that memory cells occupy multiple planes or multiple memory device levels, thereby forming a structure in three dimensions (e.g., in the x, y, and z directions, where the z direction is substantially perpendicular and the x and y directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in they direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

By way of non-limiting example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

A person of ordinary skill in the art will recognize that the technology described herein is not limited to a single specific memory structure, but covers many relevant memory structures within the spirit and scope of the technology as described herein and as understood by one of ordinary skill in the art.

FIG. 5 is a block diagram of example storage device 300, depicting more details of controller 322. In one embodiment, the system of FIG. 5 is a solid-state drive (SSD). As used herein, a flash memory controller is a device that manages data stored on flash memory and communicates with a host, such as a computer or other electronic device. A flash memory controller may have various functionalities in addition to the specific functionalities described herein. For example, the flash memory controller may format the flash memory to ensure the memory is operating properly, map out bad flash memory cells, and allocate spare memory cells to be substituted for future failed memory cells. Some part of the spare memory cells can be used to hold firmware to operate the flash memory controller and implement other features. During operation, when a host reads data from or writes data to the flash memory, the host will communicate with the flash memory controller. If the host provides a logical address to which data is to be read/written, the flash memory controller may convert the logical address received from the host to a physical address in the flash memory. Alternatively, in some embodiments, the host may provide the physical address. The flash memory controller may also perform various memory management functions such as, but not limited to, wear leveling (e.g., distributing writes to avoid wearing out specific blocks of memory that may otherwise be repeatedly written to) and garbage collection (e.g., after a block is full, moving only the valid pages of data to a new block, so the full block can be erased and reused). Non-volatile memories other than flash may have non-volatile memory controllers that are similar to flash memory controllers.

The communications interface between controller 322 and non-volatile memory dies 308 may be any suitable flash interface, such as toggle mode. In one embodiment, storage device 300 may be a card based system, such as a secure digital (SD) or a micro secure digital (micro-SD) card. In another embodiment, storage system 300 may be part of an embedded storage system. For example, the flash memory may be embedded within the host, such as in the form of a solid-state disk drive installed in a personal computer.

In some embodiments, storage system 300 includes a single channel between controller 322 and non-volatile memory dies 308. However, the subject matter described herein is not limited to having a single memory channel. For example, in some storage system architectures, two, four, eight, or more channels may exist between the controller and the memory dies 308 (e.g., depending on controller capabilities). In any of the embodiments described herein, more than a single channel may exist between the controller and the memory dies 308, even if a single channel is shown in the drawings.

As depicted in FIG. 5, controller 322 includes a front-end module 508 that interfaces with a host, a back-end module 510 that interfaces with the one or more non-volatile memory dies 308, and various other modules that perform functions which are described herein.

The components of controller 322 depicted in FIG. 5 may take the form of a packaged functional hardware unit (e.g., an electrical circuit) designed for use with other components, a portion of a program code (e.g., software or firmware) executable by processing circuitry that performs a particular function or related functions, or a self-contained hardware or software component that interfaces with a larger system. The controller 322 may include an application-specific integrated circuit (ASIC), a field programmable gate array (FPGA), a circuit, a digital logic circuit, an analog circuit, a combination of discrete circuits, gates, or any other type of hardware or combination thereof. The architecture depicted in FIG. 5 is one example implementation that may or may not use the components of controller 322 depicted in FIG. 4 (e.g., RAM, ROM, processor, interface).

Referring again to modules of the controller 322, a buffer manager/bus controller 514 manages buffers in random access memory (RAM) 516 and controls the internal bus arbitration of controller 322. A read-only memory (ROM) 518 stores system boot code. Although illustrated in FIG. 3 as located separately from the controller 322, in other embodiments, one or both of the RAM 516 and ROM 518 may be located both within the controller 322 and outside the controller 322. Further, in some implementations, the controller 322, RAM 516, and ROM 518 may be located on separate semiconductor dies.

Front-end module 508 includes a host interface 520 and a physical layer interface 522 (PHY) that provide the electrical interface with the host or next level storage controller. The choice of the type of host interface 520 can depend on the type of memory being used. Examples of host interfaces 520 include, for example, SATA, SATA Express, SAS, Fibre Channel, USB, PCIe, and NVMe. The host interface 520 may be a communication interface that facilitates transfer for data, control signals, and timing signals.

Back-end module 510 includes an error correction controller (ECC) engine 524 that encodes the data bytes received from the host and decodes and error corrects the data bytes read from the non-volatile memory. A command sequencer 526 generates command sequences, such as program and erase command sequences, to be transmitted to non-volatile memory dies 308. A RAID (redundant array of independent dies) module 528 manages generation of RAID parity and recovery of failed data. The RAID parity may be used as an additional level of integrity protection for the data being written into the storage device 300. In some cases, the RAID module 528 may be a part of the ECC engine 524. Note that the RAID parity may be added as an extra die or dies, or may be added within existing dies (e.g., as extra plane(s), extra block(s), or extra WL(s) within block(s). ECC engine 524 and RAID module 528 may calculate redundant data that can be used to recover when errors occur and may be considered examples of redundancy encoders. Together, ECC engine 524 and RAID module 528 may be considered to form a combined redundancy encoder 534. A memory interface 530 provides the command sequences to non-volatile memory die 308 and receives status information from non-volatile memory dies 308. In some embodiments, memory interface 530 may be a double data rate (DDR) interface. A flash control layer 532 controls the overall operation of back-end module 510.

In the example embodiment, back-end module 510 also includes an encryption controller 550. The encryption controller 550 performs many of the various parity protection methods for encrypting and decrypting data as shown and described herein with respect to FIGS. 1A-2B. More specifically, in an example embodiment, the controller 322 uses and maintains various control data associated with management and usage of the memory 308. This control data may include, for example, translation tables that are used to map relations between logical block addresses ("LBAs") and physical addresses of memory blocks (e.g., where a particular logical block is physically stored within the memory 308), manage which blocks are free or used, and the like. During operation, such control data may be encrypted by the controller 322 and sent to the host 340 via data bus 320. For example, the translation table includes a mapping of LBAs and associated physical addresses, and the controller 322 may encrypt the either or both the LBAs and physical addresses and transfer the encrypted table to the host 340 (e.g., where the encrypted addresses of the translation table are the data blocks 102, 116 of FIGS. 1A-2B).

During write operations, the host 340 performs a write operation on a particular logical block. The host 340 transmits a write operation to the storage device 300 that includes the LBA of the block for the write (e.g., as a plain text address). The controller 322 translates the LBA to an associated physical address before performing the write operation. On completion of the write command, the encryption engine 350 encrypts the table or associated addresses therein and passes the encrypted mapping back to the host 340. While the host 340 stores the table as encrypted data (e.g., encrypted physical address) for that particular LBA, the host 340 associates that encrypted control data with that particular LBA. During read operations, the host 340 sends the encrypted address for that LBA to the controller 322. The encryption engine 350 decrypts the address to identify the physical address, then reads the data from physical memory before transmitting that data back to the host 340.

Additional components of storage device 300 illustrated in FIG. 5 include media management layer 538, which performs wear leveling of memory cells of non-volatile memory dies 308. Storage device 300 also includes other discrete components 540, such as external electrical interfaces, external RAM, resistors, capacitors, or other components that may interface with controller 322. In other embodiments, one or more of the physical layer interface 522, media management layer 538, and buffer management/bus controller 514 are optional components that are not necessary in the controller 322.

The Flash Translation Layer (FTL) or Media Management Layer (MML) 538 may be integrated as part of the flash management that may handle flash errors and interfacing with the host. In particular, MML may be a module in flash management and may be responsible for the internals of NAND management. In particular, the MML 538 may include an algorithm in the storage device firmware which translates writes from the host into writes to the flash memory structure 326 of memory dies 308. The MML 538 may be used because, for example, the flash memory may have limited endurance, the flash memory structure 326 may only be written in multiples of pages, or the flash memory structure 326 may not be written unless it is erased as a block (e.g., a block may be considered to be a minimum unit of erase and such a non-volatile memory may be considered a block-erasable non-volatile memory). The MML 538 is configured to operate under these potential limitations of the flash memory structure 326, which may not be visible to the host. Accordingly, the MML 538 attempts to translate the writes from host into writes into the flash memory structure 326.

Controller 322 may interface with one or more memory dies 308. In one embodiment, controller 322 and multiple memory dies 308 (e.g., together making up the storage device 300) implement an SSD, which can emulate, replace, or be used instead of a hard disk drive inside a host device, as a NAS device, or the like. Additionally, the SSD need not be made to work as a hard drive.

The term computer-readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by a computing device. Any such computer storage media may be part of the computing device. Computer storage media does not include a carrier wave or other propagated or modulated data signal.

Additionally, examples described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various examples.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
encrypting a data block using a first key schedule that includes a plurality of round keys generated from an encryption key, the encrypting resulting in an encrypted data block;
during the encrypting, modifying a key register during a first plurality of iterations, the key register being updated to a final state after a final iteration of the plurality of iterations, and wherein modifying the key register for each of the first plurality of iterations comprises:
cyclically rotating bits of the key register a predetermined number of positions;
performing a non-linear substitution operation on a first predetermined number of bits in a first set of predetermined bit positions of the key register; and
performing an exclusive-or (XOR) operation between (i) a second predetermined number of bits in a second set of predetermined bit positions of the key register and (ii) a value of a round counter for the first plurality of iterations;
storing the final state of the key register as a decryption key; and
decrypting the encrypted data block using a second key schedule that includes the plurality of round keys that are generated using the decryption key during a second plurality of iterations.

2. The method of claim 1, wherein decrypting the encrypted data block further comprises:
storing the decryption key into the key register;
initiating the second plurality of iterations starting at a last iteration value and decreasing to a first iteration value; and during each iteration of the second plurality of iterations:
    updating the key register based, at least in part, on a current iteration value; and
    generating a round key from the key register using a first number of most significant bits of the key register.

3. The method of claim 2, wherein decrypting the encrypted data block further comprises:
    storing the encrypted data block in a data register; and
    during each iteration of the second plurality of iterations:
        applying the generated round key to the data register by performing an exclusive-or (XOR) operation on the data register using the generated round key.

4. The method of claim 2, wherein updating the key register based, at least in part, on the current iteration value further comprises:
    performing an exclusive-or (XOR) operation between (i) a first predetermined number of bits in a first set of predetermined bit positions of the key register and (ii) a value of a round counter for the second plurality of iterations;
    performing an inverse non-linear substitution operation on a second predetermined number of bits in a second set of predetermined bit positions of the key register; and
    cyclically rotating bits of the key register a predetermined number of bit positions in a predetermined direction.

5. The method of claim 1, wherein cyclically rotating bits of the key register a predetermined number of positions comprises cyclically rotating the bits of the key register the predetermined number of bit positions in a predetermined direction.

6. The method of claim 1, further comprising:
    during each iteration of the first plurality of iterations:
        performing an encrypting operation using a round counter previously generated from the key register; and
        in parallel with the performing of the encryption, generating a next round counter using the key register, the next round counter to be used during a next iteration.

7. The method of claim 1, further comprising, during the encrypting:
    storing the encryption key into the key register;
    generating a first round key;
    initiating the first plurality of iterations starting at a first iteration value and increasing to a last iteration value; and
    during each iteration of the first plurality of iterations:
        performing an encrypting operation using a round counter previously generated; and
        in parallel with the performing of the encryption, generating a next round counter using the key register to be used during a next iteration.

8. A storage device, comprising:
    a non-volatile storage device comprising a plurality of memory dies, the non-volatile storage device including a plurality of memory cells; and
    a controller communicatively coupled to the non-volatile storage device and configured to:
        encrypt a data block using a first key schedule that includes a plurality of round keys generated from an encryption key, the encrypting resulting in an encrypted data block;
        during the encrypting, modify a key register during a first plurality of iterations, the key register being updated to a final state after a final iteration of the plurality of iterations and wherein modifying the key register during each of the first plurality of iterations comprises:
            cyclically rotating bits of the key register a predetermined number of positions;
            performing a non-linear substitution operation on a first predetermined number of bits in a first predetermined set of bit positions of the key register; and
            performing an exclusive-or (XOR) operation between (i) a second predetermined number of bits in a second set of predetermined bit positions of the key register and (ii) a value of a round counter for the first plurality of iterations;
        store the final state of the key register as a decryption key; and
        decrypt the encrypted data block using a second key schedule that includes the plurality of round keys that are generated using the decryption key during a second plurality of iterations.

9. The storage device of claim 8, wherein decrypting the encrypted data block further comprises:
    storing the decryption key into the key register;
    initiating the second plurality of iterations starting at a last iteration value and decreasing to a first iteration value; and
    during each iteration of the second plurality of iterations:
        updating the key register based, at least in part, on a current iteration value; and
        generating a round key from the key register using a first number of most significant bits of the key register.

10. The storage device of claim 9, wherein decrypting the encrypted data block further comprises:
    storing the encrypted data block in a data register; and
    during each iteration of the second plurality of iterations:
        apply the generated round key to the data register by performing an exclusive-or (XOR) operation on the data register using the generated round key.

11. The storage device of claim 9, wherein updating the key register based, at least in part, on the current iteration value further comprises:
    performing an exclusive-or (XOR) operation between (i) a first predetermined number of bits in a first set of predetermined bit positions of the key register and (ii) a value of a round counter for the second plurality of iterations;
    performing an inverse non-linear substitution operation on a second predetermined number of bits in a second set of predetermined bit positions of the key register; and
    cyclically rotating bits of the key register a predetermined number of bit positions in a predetermined direction.

12. The storage device of claim 8, wherein cyclically rotating bits of the key register a predetermined number of positions comprises cyclically rotating the bits of the key register the predetermined number of bit positions in a predetermined direction.

13. The storage device of claim 8, wherein the controller is further configured to:
    during each iteration of the first plurality of iterations:
        perform an encrypting operation using a round counter previously generated from the key register; and
        in parallel with the performing of the encryption, generate a next round counter using the key register to be used during the next iteration.

14. The storage device of claim 8, wherein the controller is further configured to, during the encrypting:
    store the encryption key into the key register;
    generate a first round key;
    initiate the first plurality of iterations starting at a first iteration value and increasing to a last iteration value; and during each iteration of the first plurality of iterations:
    perform an encrypting operation using a round counter previously generated; and
    in parallel with the performing of the encryption, generate a next round counter using the key register to be used during the next iteration.

15. A storage device, comprising:
    a non-volatile storage device comprising a plurality of memory dies, the non-volatile storage device including a plurality of memory cells; and
    means for encrypting a data block using a first key schedule that includes a plurality of round keys generated from an encryption key, the encrypting resulting in an encrypted data block;
    means for modifying a key register during a first plurality of iterations, the key register being updated to a final state after a final iteration of the plurality of iterations, the means for modifying the key register comprising:
        means for cyclically rotating bits of the key register a predetermined number of positions;
        means for performing a non-linear substitution operation on a first predetermined number of bits in first predetermined bit positions of the key register; and
        means for performing an exclusive-or (XOR) operation between (i) a second predetermined number of bits in second predetermined bit positions of the key register and (ii) a value of a round counter for the first plurality of iterations;
    means for storing the final state of the key register as a decryption key; and
    means for decrypting the encrypted data block using a second key schedule that includes the plurality of round keys that are generated using the decryption key during a second plurality of iterations.

16. The storage device of claim 15, wherein decrypting the encrypted data block further comprises:
    means for storing the decryption key into the key register;
    means for initiating the second plurality of iterations starting at a last iteration value and decreasing to a first iteration value; and
    during each iteration of the second plurality of iterations:
        means for updating the key register based, at least in part, on a current iteration value; and
        means for generating a round key from the key register using a first number of most significant bits of the key register.

17. The storage device of claim 16, wherein decrypting the encrypted data block further comprises:
    means for storing the encrypted data block in a data register; and
    during each iteration of the second plurality of iterations:
        means for applying the generated round key to the data register by performing an exclusive-or (XOR) operation on the data register using the generated round key.

18. The storage device of claim 16, wherein updating the key register based, at least in part, on the current iteration value further comprises:
    means for performing an exclusive-or (XOR) operation between (i) a first predetermined number of bits in predetermined bit positions of the key register and (ii) a value of a round counter for the second plurality of iterations;
    means for performing an inverse non-linear substitution operation on a second predetermined number bits in a second set of predetermined bit positions of the key register; and
    means for cyclically rotating bits of the key register a predetermined number of bit positions in a predetermined direction.

19. The storage device of claim 15, further comprising:
    during each iteration of the first plurality of iterations:
        means for performing an encrypting operation using a round counter previously generated from the key register; and
        in parallel with the performing of the encryption, means for generating a next round counter using the key register to be used during the next iteration.

20. The storage device of claim 15, further comprising, during the encrypting:
    means for storing the encryption key into the key register;
    means for generating a first round key;
    means for initiating the first plurality of iterations starting at a first iteration value and increasing to a last iteration value; and
    during each iteration of the first plurality of iterations:
        means for performing an encrypting operation using a round counter previously generated; and
        in parallel with the performing of the encryption, means for generating a next round counter using the key register to be used during the next iteration.

* * * * *